United States Patent
Morishita et al.

(10) Patent No.: US 11,280,251 B2
(45) Date of Patent: Mar. 22, 2022

(54) IN-VEHICLE COOLING SYSTEM AND METHOD FOR CONTROLLING THE SAME

(71) Applicant: TOYOTA JIDOSHA KABUSHIKI KAISHA, Toyota (JP)

(72) Inventors: Daisaku Morishita, Toyota (JP); Hirokazu Andoh, Seto (JP); Kazuki Kato, Toyoake (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/161,044

(22) Filed: Jan. 28, 2021

(65) Prior Publication Data

US 2021/0293175 A1    Sep. 23, 2021

(30) Foreign Application Priority Data

Mar. 18, 2020  (JP) .............................. JP2020-047814

(51) Int. Cl.
*F01P 3/20*   (2006.01)
*F01P 7/14*   (2006.01)
(Continued)

(52) U.S. Cl.
CPC .............. *F01P 7/14* (2013.01); *B60K 11/04* (2013.01); *B60K 17/02* (2013.01); *F01P 3/20* (2013.01);
(Continued)

(58) Field of Classification Search
CPC .......... F01P 2007/146; F01P 3/20; F01P 7/14; F01P 2023/08; F01P 2003/008; F01P 2007/143; F01P 2025/08; F01P 3/00
See application file for complete search history.

(56) References Cited

U.S. PATENT DOCUMENTS

2010/0058999 A1*   3/2010   Arnott ................. F16H 57/0417
                                                     123/41.1
2011/0146945 A1*   6/2011   Morita ............... B60H 1/00764
                                                     165/51
(Continued)

FOREIGN PATENT DOCUMENTS

JP     2006-105093 A    4/2006
JP     2006-226333 A    8/2006
(Continued)

*Primary Examiner* — Long T Tran
(74) *Attorney, Agent, or Firm* — Finnegan, Henderson, Farabow, Garrett & Dunner, LLP

(57) ABSTRACT

Processing circuitry of an in-vehicle cooling system regulates the flow rate of the coolant passing through a radiator, thereby regulating the coolant temperature to a target coolant temperature. The processing circuitry sets the target coolant temperature to a specified standard target coolant temperature when the engine is not operating in a specified temperature increase permitting range, and sets the target coolant temperature to a high target coolant temperature, which is higher than the standard target coolant temperature, when the engine is operating in the temperature increase permitting range. The processing circuitry changes the target coolant temperature in the temperature increase permitting range to a temperature lower than the high target coolant temperature and higher than or equal to the standard target coolant temperature, when the hydraulic oil temperature is higher than or equal to a specified temperature increase suppressing temperature.

11 Claims, 6 Drawing Sheets

(51) Int. Cl.
    *B60K 11/04*     (2006.01)
    *B60K 17/02*     (2006.01)
    *F01P 5/12*     (2006.01)
    *F16H 57/04*     (2010.01)
    *F16K 31/02*     (2006.01)
    *G06F 1/20*     (2006.01)

(52) U.S. Cl.
CPC ............ *F01P 5/12* (2013.01); *F16H 57/0413* (2013.01); *F16H 57/0415* (2013.01); *F16K 31/02* (2013.01); *G06F 1/206* (2013.01); *F01P 2007/146* (2013.01); *F01P 2060/045* (2013.01)

(56) References Cited

U.S. PATENT DOCUMENTS

| | | | | |
|---|---|---|---|---|
| 2012/0312498 | A1* | 12/2012 | Kim | F01P 7/165 |
| | | | | 165/41 |
| 2017/0016381 | A1* | 1/2017 | Yumisashi | F16K 31/0675 |
| 2017/0321595 | A1* | 11/2017 | Jang | F01P 7/16 |
| 2018/0038267 | A1* | 2/2018 | Murai | F01P 7/16 |
| 2018/0080366 | A1* | 3/2018 | Toyama | F16H 57/0475 |
| 2018/0252146 | A1* | 9/2018 | Nagai | F01P 3/02 |
| 2018/0266304 | A1* | 9/2018 | Toyama | F01P 7/04 |
| 2019/0040830 | A1* | 2/2019 | Imaoka | F01P 3/02 |
| 2019/0055877 | A1* | 2/2019 | Park | F01P 7/165 |

FOREIGN PATENT DOCUMENTS

| | | |
|---|---|---|
| JP | 2010-175062 A | 8/2010 |
| JP | 2015-218603 A | 12/2015 |
| JP | 2019-132197 A | 8/2019 |

\* cited by examiner

IN-VEHICLE COOLING SYSTEM AND METHOD FOR CONTROLLING THE SAME

BACKGROUND

1. Field

The present disclosure relates to an in-vehicle cooling system and a method for controlling the in-vehicle cooling system.

2. Description of Related Art

Japanese Laid-Open Patent Publication No. 2019-132197 discloses an in-vehicle cooling system that controls coolant temperature in order to improve the efficiency of an engine. An increase in the coolant temperature increases the temperature of the wall surface of a cylinder. This improves the efficiency of the engine, but also makes knocking occur easily. If knocking occurs, the ignition timing is retarded to suppress the knocking, which reduces the engine efficiency. Accordingly, if a target temperature of coolant is increased in an operating state in which knocking is likely to occur, the extent of reduction in the engine efficiency due to retardation of the ignition timing exceeds the extent of improvement of the engine efficiency due to an increase in the temperature of the cylinder wall surface. This ultimately results in reduction in the engine efficiency. On the other hand, during a low load operation of the engine, the upper limit of the cylinder wall temperature that suppresses knocking is high as compared to a high load operation. In this regard, the in-vehicle cooling system disclosed in Japanese Laid-Open Patent Publication No. 2019-132197 executes a coolant temperature increasing control, in which the target temperature of the coolant is set to a high temperature only during a low load operation of the engine, so as to improve the engine efficiency.

Japanese Laid-Open Patent Publication No. 2010-175062 discloses an in-vehicle cooling system that delivers coolant that has passed through the interior of an engine to an oil cooler in a transmission, thereby cooling hydraulic oil in the transmission through heat exchange between the coolant and the hydraulic oil in the oil cooler. Japanese Laid-Open Patent Publication No. 2006-226333, Japanese Laid-Open Patent Publication No. 2015-218603, and Japanese Laid-Open Patent Publication No. 2006-105093 disclose similar in-vehicle cooling systems.

In such in-vehicle cooling systems, when the target temperature of coolant is increased through the coolant temperature increasing control, the cooling efficiency of the hydraulic oil in the oil cooler is reduced. The temperature of the hydraulic oil is thus likely to increase. In some cases, an increase in the hydraulic oil temperature limits the operation of the transmission. For example, Japanese Laid-Open Patent Publication No. 2006-226333 discloses that flex lock-up control of the lock-up clutch in the toque converter of the transmission is prohibited when the temperature of the hydraulic oil of the transmission exceeds a specified temperature.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an in-vehicle cooling system includes a coolant circuit, a radiator, an oil cooler, and processing circuitry. The coolant circuit has a portion that passes through an inside of an engine. The radiator is provided in the coolant circuit and is configured to cool coolant through heat exchange between the coolant and an outside air. The oil cooler is provided in the coolant circuit and is configured to cool hydraulic oil of a transmission through heat exchange between the hydraulic oil and the coolant. The processing circuitry is configured to regulate a radiator flow rate, which is a flow rate of the coolant passing through the radiator, thereby regulating a temperature of the coolant to a target coolant temperature. The processing circuitry is configured to execute a coolant temperature increasing control and a temperature increase suppressing process. The coolant temperature increasing control sets the target coolant temperature to a specified standard target coolant temperature when the engine is not operating in a specified temperature increase permitting range, and sets the target coolant temperature to a high target coolant temperature, which is higher than the standard target coolant temperature, when the engine is operating in the temperature increase permitting range. The temperature increase suppressing process changes, in the coolant temperature increasing control, the target coolant temperature that is set when the engine is operating in the temperature increase permitting range to a temperature lower than the high target coolant temperature and higher than or equal to the standard target coolant temperature, when a temperature of the hydraulic oil is higher than or equal to a specified temperature increase suppressing temperature.

In another aspect, a method of controlling an in-vehicle cooling system is provided. The in-vehicle cooling system includes a coolant circuit, a radiator, and an oil cooler. The coolant circuit has a portion that passes through an inside of an engine. The radiator is provided in the coolant circuit and is configured to cool coolant through heat exchange between the coolant and an outside air. The oil cooler is provided in the coolant circuit and is configured to cool hydraulic oil of a transmission through heat exchange between the hydraulic oil and the coolant. The method includes: regulating a radiator flow rate, which is a flow rate of the coolant passing through the radiator, thereby regulating a temperature of the coolant to a target coolant temperature; setting the target coolant temperature to a specified standard target coolant temperature when the engine is not operating in a specified temperature increase permitting range; setting the target coolant temperature to a high target coolant temperature, which is higher than the standard target coolant temperature, when the engine is operating in the temperature increase permitting range; and changing the target coolant temperature that is set when the engine is operating in the temperature increase permitting range to a temperature lower than the high target coolant temperature and higher than or equal to the standard target coolant temperature, when a temperature of the hydraulic oil is higher than or equal to a specified temperature increase suppressing temperature.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

An in-vehicle cooling system according to a first embodiment will be described with reference to FIGS. 1 to 6.

Figure 1:
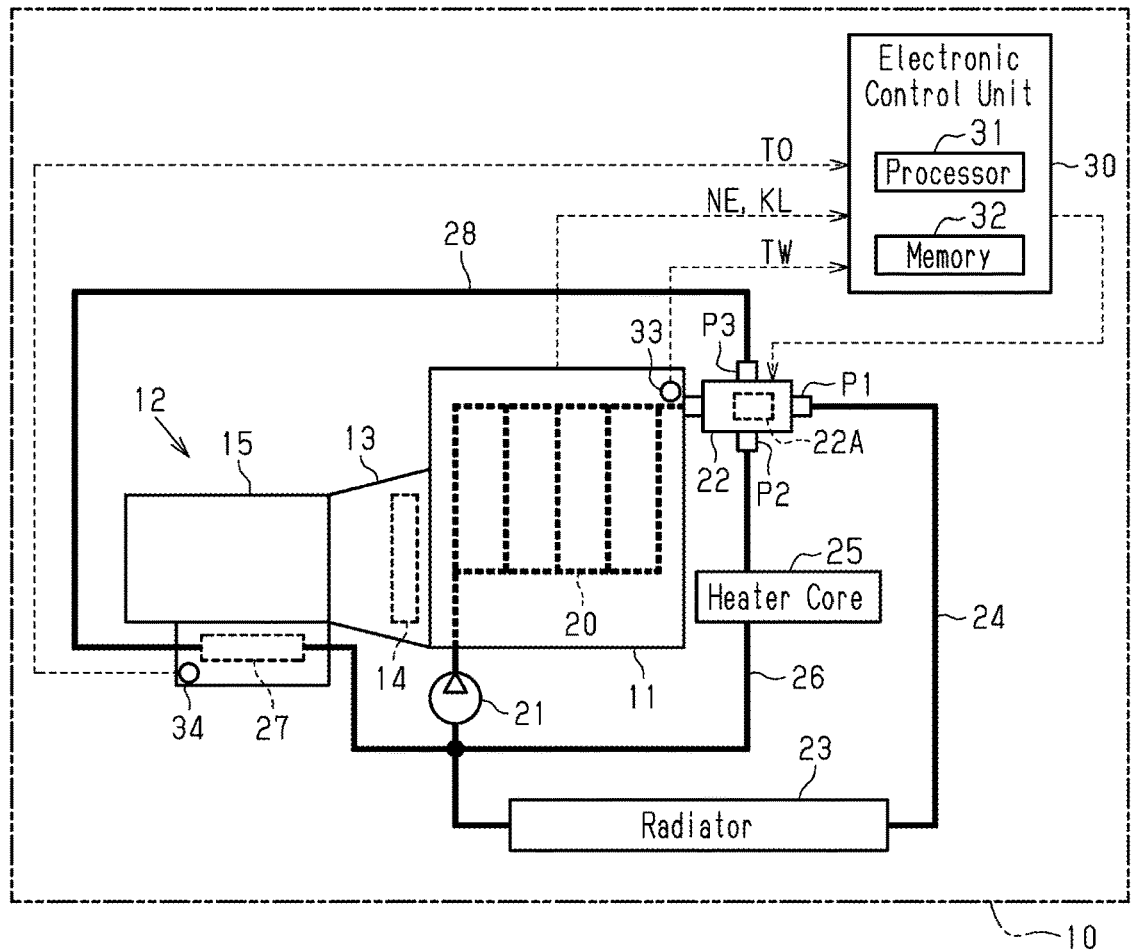
FIG. 1 is a schematic diagram of an in-vehicle cooling system according to a first embodiment.

As shown in FIG. 1, a vehicle 10 in which the in-vehicle cooling system of the present embodiment is employed includes an engine 11 and a transmission 12 coupled to the engine 11. The transmission 12 includes a toque converter 13, a lock-up clutch 14, and a gearbox 15. The toque converter 13 is a liquid coupling that transmits torque from the engine 11 to the gearbox 15 through hydraulic oil of the transmission 12, which is a torque transmitting medium. The lock-up clutch 14 is a mechanical clutch capable of transmitting torque of the engine 11 to the gearbox 15 without fluid such as hydraulic oil. The lock-up clutch 14 is operated by using the hydraulic oil of the transmission 12 as an activation pressure transmitting medium. The gearbox 15 includes multiple planetary gear mechanisms and multiple hydraulic frictional engagement elements. The gearbox 15 switches gears by changing the combination of engagement/disengagement states between the hydraulic frictional engagement elements.

An in-vehicle cooling system used with the engine 11 of the vehicle 10 includes a mechanical water pump 21, which is driven by rotation of the engine 11 to deliver coolant under pressure to a water jacket 20 in the engine 11. A flow rate control valve 22 is provided at a coolant outlet of the water jacket 20. The flow rate control valve 22 includes three discharge ports for discharging coolant from the water jacket 20: a radiator port P1, a heater port P2, and a transmission port P3. The flow rate control valve 22 also incorporates a valve member 22A configured such that the opening areas of the discharge ports depend on the operating position of the valve member 22A.

A radiator passage 24 is connected to the radiator port P1. The radiator passage 24 returns coolant to the water pump 21 via a radiator 23, which cools the coolant through heat exchange with outside air. A heater passage 26 is connected to the heater port P2. The heater passage 26 returns coolant to the water pump 21 via a heater core 25 for warming the passenger compartment. A transmission passage 28 is connected to the transmission port P3. The transmission passage 28 returns coolant to the water pump 21 via an oil cooler-warmer 27 provided in the transmission 12. The oil cooler-warmer 27 is a heat exchanger that performs heat exchange between the hydraulic oil of the transmission 12 and the coolant of the transmission passage 28. When the temperature of the hydraulic oil is higher than that of the coolant, the oil cooler-warmer 27 functions as an oil cooler that cools the hydraulic oil using the coolant. When the temperature of the hydraulic oil is lower than that of the coolant, the oil cooler-warmer 27 functions as an oil warmer that warms the hydraulic oil using the heat of the coolant. The ratio of the flow rates of the coolant through the radiator passage 24, the heater passage 26, and the transmission passage 28 is changed according to the operating position of the valve member 22A of the flow rate control valve 22.

The heater passage 26 and the transmission passage 28 are bypass passages that bypass the radiator 23. The in-vehicle cooling system includes a coolant circuit that is configured such that, after passing through the water jacket 20 in the engine 11, the coolant from the water pump 21 is returned to the water pump 21 through one of the radiator passage 24 the heater passage 26, or the transmission passage 28.

In place of the flow rate control valve 22, which has the above-described configuration, a flow rate control valve that has the configuration discussed below may be provided at the merging point of the radiator passage 24, the heater passage 26, and the transmission passage 28. That is, the flow rate control valve provided at the merging point includes a discharge port connected to the water pump 21 and three inlet ports respectively connected to the radiator passage 24, the heater passage 26, and the transmission passage 28. The flow rate control valve is configured to change the ratio of the flow rates of the coolant through the radiator passage 24, the heater passage 26, and the transmission passage 28 by changing the opening areas of the inlet ports.

The in-vehicle cooling system includes an electronic control unit 30, which is a coolant temperature controller. The electronic control unit 30 includes a processor 31 and a memory device 32. The processor 31 executes a calculation process related to control of the in-vehicle cooling system. The memory device 32 stores programs and data for the control. The electronic control unit 30 is connected to a coolant temperature sensor 33 and an oil temperature sensor 34. The coolant temperature sensor 33 detects an outlet coolant temperature TW, which is the temperature of coolant when flowing into the flow rate control valve 22 after passing through the water jacket 20, and outputs the detection result to the electronic control unit 30. The oil temperature sensor 34 detects a transmission oil temperature TO, which is the temperature of hydraulic oil of the transmission 12, and outputs the detection result to the electronic control unit 30. The electronic control unit 30 receives information related to the operating state of the engine 11, such as an engine rotation speed NE and an engine load KL. On the basis of the received information, the electronic control unit 30 performs coolant temperature control to regulate the temperature of the coolant in accordance with the operating state of the engine 11. The electronic control unit 30 performs the coolant temperature control by causing the processor 31 to read and execute programs stored in the memory device 32.

An overview of the coolant temperature control will now be described. At the coolant temperature control, the electronic control unit 30 first sets a target coolant temperature TW* on the basis of the operating state of the engine 11 and the transmission oil temperature TO. The electronic control unit 30 regulates the operating position of the valve member 22A of the flow rate control valve 22 in accordance with the difference between the target coolant temperature TW* and the outlet coolant temperature TW. Specifically, when the outlet coolant temperature TW is higher than the target coolant temperature TW*, the electronic control unit 30 changes the operating position of the valve member 22A so as to increase the opening area of the radiator port P1, thereby increasing the flow rate of the coolant passing through the radiator 23. When the outlet coolant temperature TW is lower than the target coolant temperature TW*, the electronic control unit 30 changes the operating position of the valve member 22A so as to reduce the opening area of the radiator port P1, thereby reducing the flow rate of the coolant passing through the radiator 23. In this manner, the electronic control unit 30 regulates the flow rate of the coolant passing through the radiator 23, so as to regulate the outlet coolant temperature TW to the target coolant temperature TW*. In the following description, the flow rate of the coolant passing through the radiator 23 will be referred to as a radiator flow rate.

Next, setting of the target coolant temperature TW* in the coolant temperature control will be described. In the present embodiment, a coolant temperature increasing control, which will be discussed below, is executed. That is, in the coolant temperature increasing control, when the engine 11 is not operating in a specified temperature increase permitting range, the target coolant temperature TW* is set to a specified standard target coolant temperature TS. When the engine 11 is operating in the temperature increase permitting range, the target coolant temperature TW* is set to a high target coolant temperature TH, which is higher than the standard target coolant temperature TS.

Figure 2:
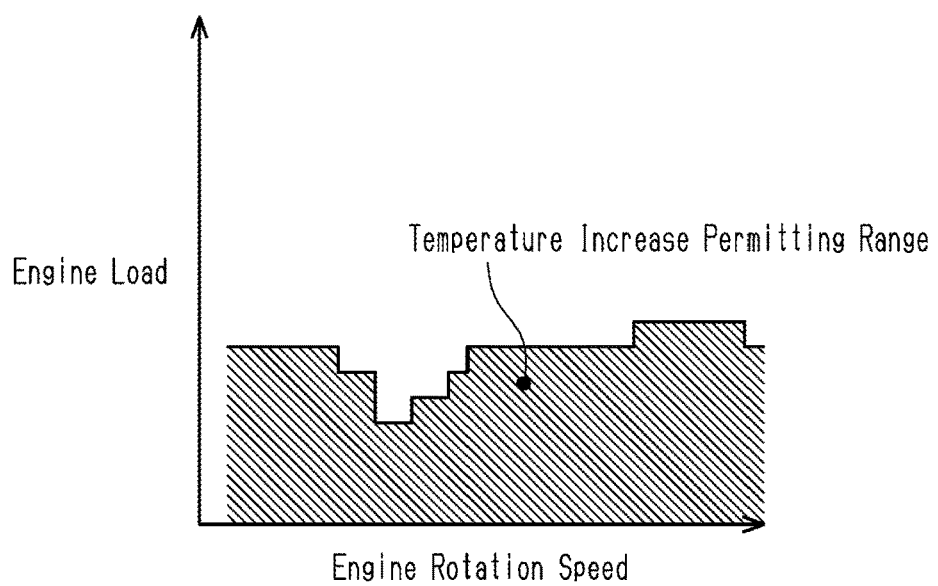
FIG. 2 is a diagram showing a manner in which a temperature increase permitting range is set in the in-vehicle cooling system of FIG. 1.

FIG. 2 shows an example of temperature setting in the temperature increase permitting range. The temperature increase permitting range is set taking into consideration the occurrence status of knocking due to the coolant temperature. In the engine 11, a knock control for ignition timing is executed. In the knock control, whether knocking is occurring is determined. Also, the advancement limit is set to an optimum ignition timing, which is an ignition timing at which the engine torque is maximized, and the ignition timing is advanced to a point close to the limit of a range in which knocking is suppressed.

Figure 3:
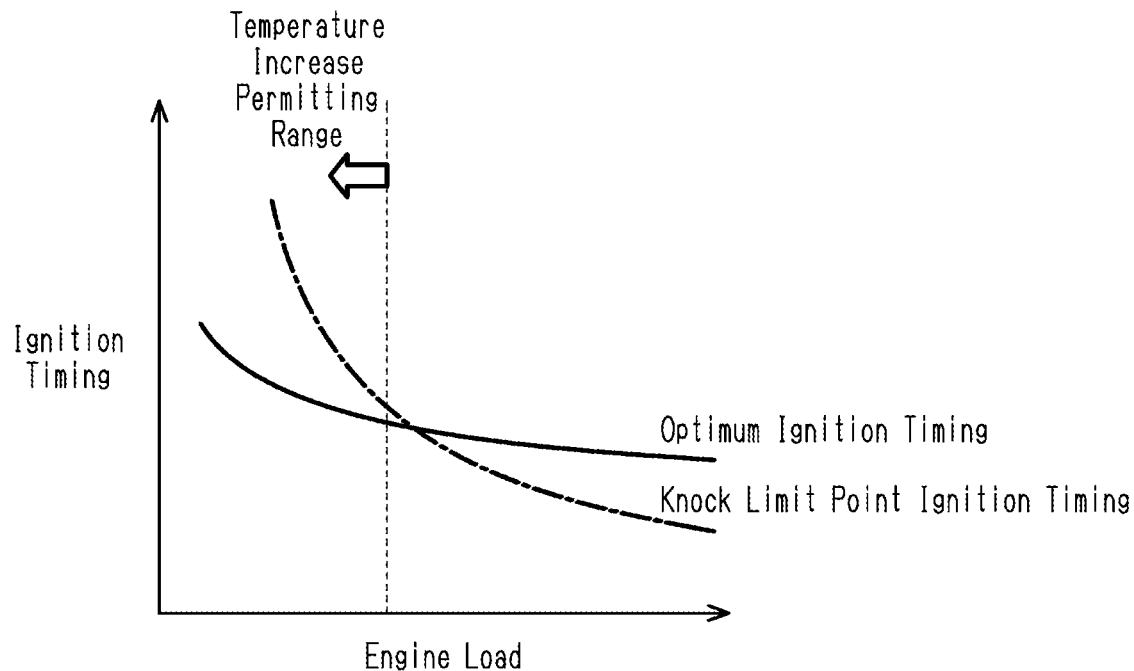
FIG. 3 is a diagram showing division of an operational zone of the engine related to the setting of a target coolant temperature in the in-vehicle cooling system of FIG. 1, together with the relationship of an engine load with an optimum ignition timing and a knock limit point ignition timing.

FIG. 3 shows changes in the optimum ignition timing and a knock limit point ignition timing when the engine load KL is changed in a state in which the engine rotation speed NE and the outlet coolant temperature TW are constant. The knock limit point ignition timing is a predicted value of the advancement limit of the ignition timing that suppresses knocking, and is acquired, for example, through experiments. As shown in FIG. 3, when the engine load KL is small, the optimum ignition timing is on the retarded side of the knock limit point ignition timing. On the other hand, the optimum ignition timing and the knock limit point ignition timing are both retarded with an increase in the engine load KL. Retardation of the knock limit point ignition timing in relation to an increase in the engine load KL is larger than retardation of the optimum ignition timing in relation to an increase in the engine load KL. Thus, in an operating range in which the engine load KL is greater than or equal to a certain value, the knock limit point ignition timing is more retarded than the optimum ignition timing. The optimum ignition timing and the knock limit point ignition timing also change depending on the engine rotation speed NE. When the outlet coolant temperature TW is lowered, the wall temperature of the cylinder of the engine 11 drops, so that knocking is less likely to occur. Thus, the knock limit point ignition timing is advanced as the outlet coolant temperature TW is lowered. In the present embodiment, the temperature increase permitting range is set to an operating range in which the optimum ignition timing when the outlet coolant temperature TW is the preset standard target coolant temperature TS is retarded from the knock limit point ignition timing by at least a predetermined amount.

Figure 4:
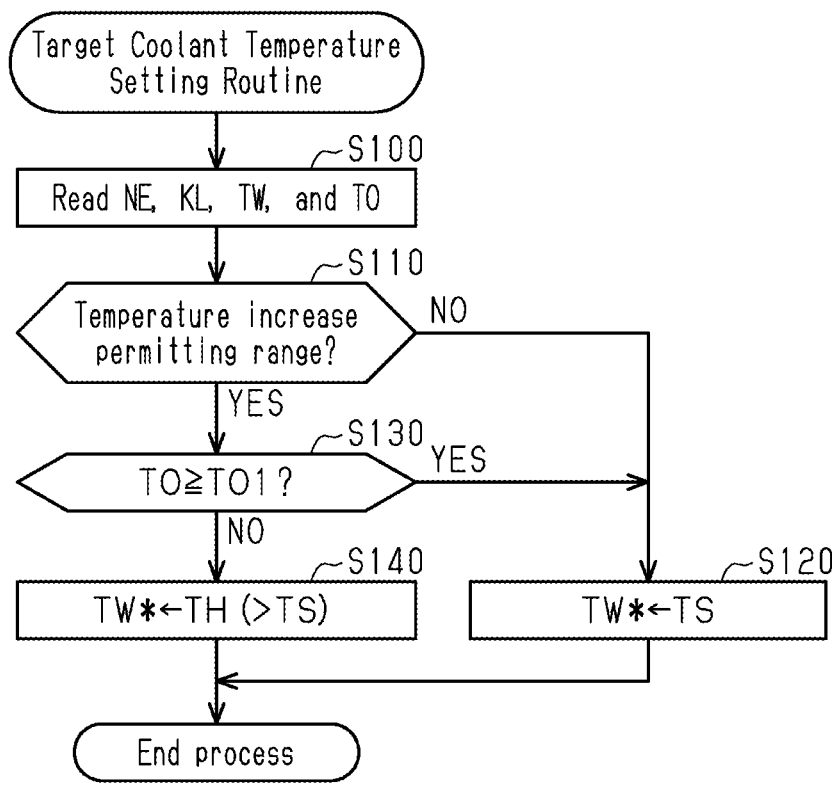
FIG. 4 is a flowchart of a target coolant temperature setting routine executed by an electronic control unit in the in-vehicle cooling system of FIG. 1.

FIG. 4 shows a flowchart of a target coolant temperature setting routine executed by the electronic control unit 30 to set the target coolant temperature TW*. The electronic control unit 30 repeatedly executes the routine at each specified control cycle during the operation of the engine 11.

When this routine is started, the electronic control unit 30 first acquires the engine rotation speed NE, the engine load KL, the outlet coolant temperature TW, the outlet coolant temperature TW, and the transmission oil temperature TO in step S100. In the subsequent step S110, the electronic control unit 30 determines whether the engine 11 is operating in the temperature increase permitting range. If the engine 11 is operating in the temperature increase permitting range (S110: YES), the process proceeds to step S130. If the engine 11 is not operating in the temperature increase permitting range (S110: NO), the process proceeds to step S120.

In step S120, the electronic control unit 30 sets the target coolant temperature TW* to the standard target coolant temperature TS, and thereafter ends the process of this routine in the current cycle.

In step S130, the electronic control unit 30 determines whether the transmission oil temperature TO is higher than or equal to a specified temperature increase suppressing temperature TO1. When the transmission oil temperature TO is lower than the temperature increase suppressing temperature TO1 (S130: NO), the process proceeds to step S140. In step S140, the electronic control unit 30 sets the target coolant temperature TW* to the high target coolant temperature TH, which is higher than the standard target coolant temperature TS, and thereafter ends the process of this routine in the current cycle. When the transmission oil temperature TO is higher than or equal to the temperature increase suppressing temperature TO1 (S130: YES), the process proceeds to step S120. That is, the target coolant temperature TW* is set to the standard target coolant temperature TS in this case.

An operation of the in-vehicle cooling system having the above-described configuration will now be described.

As described above, the transmission 12 of the vehicle 10 is provided with the lock-up clutch 14. When the lock-up clutch 14 is engaged to directly connect the engine 11 to the gearbox 15, the torque transmission efficiency is increased. However, if the lock-up clutch 14 is engaged when the vehicle speed is low or being decelerated, shock is likely to be produced. This reduces drivability. In this regard, the vehicle 10 performs a flex lock-up control to put the lock-up clutch 14 in a slipping state when the vehicle speed is low or being decelerated, thereby ensuring both the drivability and the torque transmission efficiency. During the flex lock-up control, the lock-up clutch 14 generates heat through sliding friction, so that the temperature of the hydraulic oil of the transmission 12, that is, the transmission oil temperature TO is likely increase. When the transmission oil temperature TO is excessively high, seizure occurs in the lock-up clutch 14 due to oil film shortage. Thus, when the transmission oil temperature TO exceeds a specified highest permission temperature TFL, the execution of the flex lock-up control is prohibited.

In the engine 11 of the vehicle 10, which is provided with the in-vehicle cooling system of the present embodiment, the ignition timing is retarded by the knock control if knocking occurs. This reduces the efficiency of torque generation. Knocking becomes more likely to occur as the cylinder wall temperature of the engine 11 increases. Accordingly, in a high load operating range, in which knocking is likely to occur, the cylinder wall temperature needs to be lowered by lowering the temperature of the coolant. On the other hand, in a low load operating range of the engine 11, knocking is unlikely to occur. Thus, the occurrence of knocking is suppressed even if the temperature of the coolant is high to a certain extent. If the temperature of the coolant increases, the cooling loss is reduced, and the efficiency of the engine 11 is improved. In the in-vehicle cooling system of the present embodiment, when the engine 11 is operating in the temperature increase permitting range, in which the transmission oil temperature TO is sufficiently lower than the highest permission temperature TFL, and knocking is unlikely to occur, the target coolant temperature TW* is increased from the standard target coolant temperature TS to the high target coolant temperature TH. In this manner, the temperature of the coolant is increased in an operating range in which knocking is unlikely to occur, so as to improve the fuel economy performance within a range in which knocking can be suppressed.

However, even in a state in which the transmission oil temperature TO has been increased to a temperature close to the highest permission temperature TFL, if the coolant temperature is maintained at a high temperature by the coolant temperature increasing control, it is difficult to secure an opportunity to perform the flex lock-up control. The reason for this will now be described.

Figure 5:
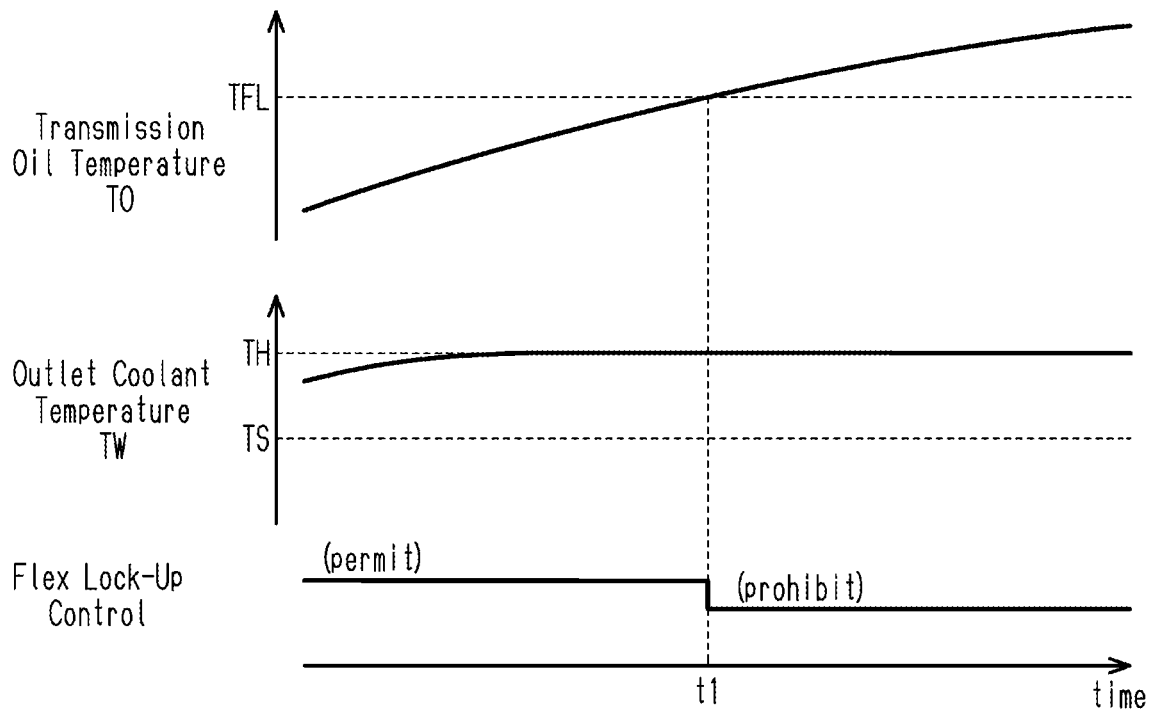
FIG. 5 is a timing diagram showing changes in a transmission oil temperature, changes in an outlet coolant temperature, and changes between permission and prohibition of flex lock-up control in an in-vehicle cooling system of a comparative example.

FIG. 5 shows a coolant temperature control in an in-vehicle cooling system of a comparative example. In the in-vehicle cooling system of the comparative example, the coolant temperature increasing control is executed regardless of whether the transmission oil temperature TO is high or low. That is, in the in-vehicle cooling system of the comparative example, the coolant temperature control is executed by setting the target coolant temperature TW* to the high target coolant temperature TH in the temperature increase permitting range, and to the standard target coolant temperature TS in other operating ranges, regardless of whether the transmission oil temperature TO is high or low. FIG. 5 shows the coolant temperature control in the in-vehicle cooling system of the comparative example when the engine 11 continues to operate in a low load region, and the transmission 12 is generating a large amount of heat. FIG. 5 shows changes in the transmission oil temperature TO, changes in the outlet coolant temperature TW, and changes between permission and prohibition of the flex lock-up control. Since the target coolant temperature TW* is maintained at the high target coolant temperature TH, the outlet coolant temperature TW is maintained at a temperature close to the high target coolant temperature TH. Accordingly, the transmission oil temperature TO increases monotonically. At a point in time t1, the transmission oil temperature TO exceeds the highest permission temperature TFL, so that execution of the flex lock-up control is prohibited.

As described above, the hydraulic oil of the transmission 12 is performed through heat exchange between the hydraulic oil of the oil cooler-warmer 27 and the coolant. Thus, the higher the outlet coolant temperature TW, the more reduced the cooling efficiency of the hydraulic oil at the oil cooler-warmer 27 becomes. Therefore, in a state in which the target coolant temperature TW* has been increased by a coolant temperature increasing process, the transmission oil temperature TO is likely to increase, and the execution of the flex lock-up control is likely to be prohibited.

Figure 6:
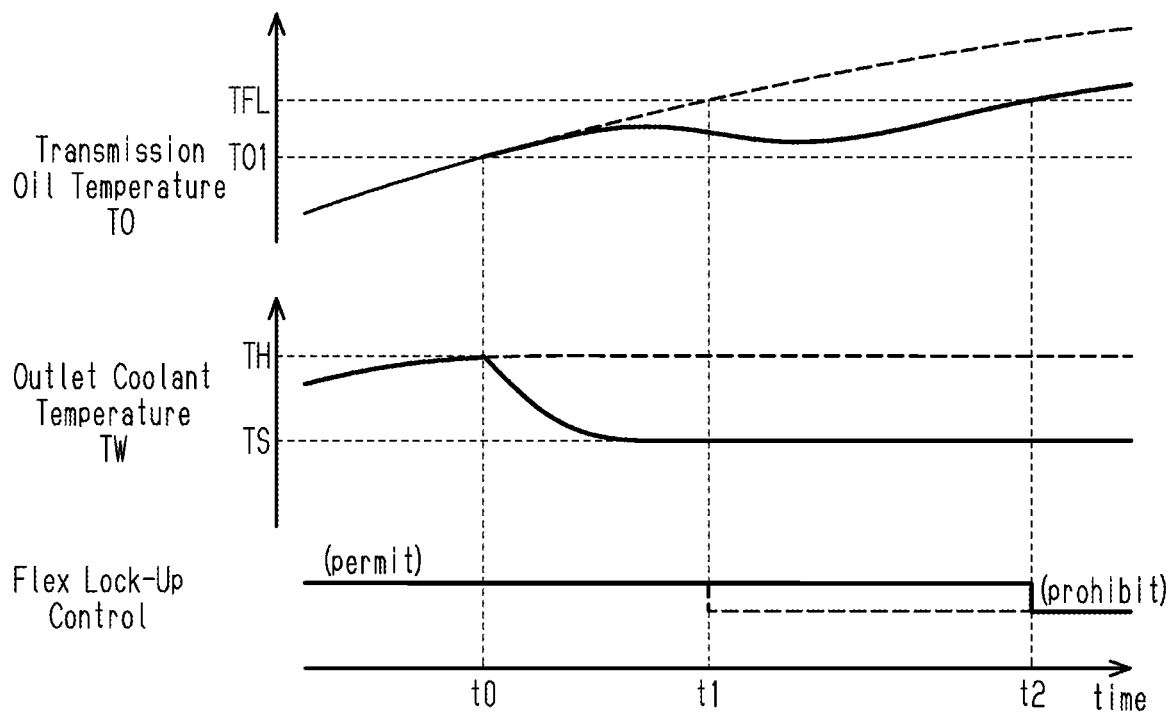
FIG. 6 is a timing diagram showing changes in a transmission oil temperature, changes in an outlet coolant temperature, and changes between permission and prohibition of flex lock-up control in the in-vehicle cooling system of FIG. 1.

FIG. 6 shows the coolant temperature control in the in-vehicle cooling system of the present embodiment when the engine 11 continues to operate in a low load region, and the transmission 12 is generating a large amount of heat, as in the case of FIG. 5. Like FIG. 5, FIG. 6 shows changes in the transmission oil temperature TO, changes in the outlet coolant temperature TW, and changes between permission and prohibition of the flex lock-up control. FIG. 6 also shows, with broken lines, changes in the transmission oil temperature TO, changes in the outlet coolant temperature TW, and changes between permission and prohibition of the flex lock-up control in the comparative example of FIG. 5.

In the case of the present embodiment, the target coolant temperature TW* is set to the high target coolant temperature TH during a period before a point in time t0, when the transmission oil temperature TO is lower than the temperature increase suppressing temperature TO1. However, in the case of the present embodiment, when the transmission oil temperature TO reaches the temperature increase suppressing temperature TO1 at the point in time to, the target coolant temperature TW* is lowered to the standard target coolant temperature TS from the high target coolant temperature TH. This lowers the outlet coolant temperature TW and ultimately the temperature of the coolant flowing into the oil cooler-warmer 27, thereby improving the cooling efficiency of the hydraulic oil of the oil cooler-warmer 27. Accordingly, a subsequent increase in the transmission oil temperature TO is limited.

In the case of FIG. 6 also, at a point in time t2, the transmission oil temperature TO exceeds the highest permission temperature TFL, so that execution of the flex lock-up control is prohibited. However, the amount of time taken to prohibit the execution of the flex lock-up control is longer in the case of the comparative example.

The flow rate of the coolant flowing into the oil cooler-warmer 27 will be referred to as a transmission cooler flow rate, and the temperature of that coolant is referred to as a transmission cooler coolant temperature. When the radiator flow rate is increased in order to lower the outlet coolant temperature TW, the transmission cooler flow rate is reduced, accordingly. Under the condition in which the transmission cooler coolant temperature is constant, a reduction in the transmission cooler flow rate reduces the cooling efficiency of the hydraulic oil of the oil cooler-warmer 27. Thus, when the extent of the reduction in the cooling efficiency of the hydraulic oil by the reduction in the transmission cooler flow rate is larger than the extent of the increase in the cooling efficiency by the reduction in the transmission cooler coolant temperature, the cooling efficiency of the hydraulic oil is lowered even if the outlet coolant temperature TW is lowered. However, in a general traveling state of the vehicle 10, the efficiency of heat exchange of the radiator 23 is higher than that of the oil cooler-warmer 27, and the extent of a reduction in the outlet coolant temperature TW caused by an increase in the radiator flow rate is larger than the extent of an increase in the transmission oil temperature TO caused by a reduction in the transmission cooler flow rate that is the same as the increase in the radiator flow rate. Therefore, if the transmission cooler coolant temperature is lowered by lowering the target coolant temperature TW* from the high target coolant temperature TH to the standard target coolant temperature TS, the cooling efficiency of the hydraulic oil in the oil cooler-warmer 27 is increased, so that an increase in the transmission oil temperature TO is limited.

The in-vehicle cooling system according to the present embodiment has the following advantages.

(1) In the coolant temperature increasing control, the electronic control unit 30 increases the target coolant temperature TW* in the temperature increase permitting range of the engine 11 from the standard target coolant temperature TS to the high target coolant temperature TH. When the target coolant temperature TW* is set to the high target coolant temperature TH, which is higher than the standard target coolant temperature TS, the coolant temperature is increased, so that the heat loss of the engine 11 is reduced. This improves the efficiency of the engine 11. Thus, in an operating range in which the coolant is permitted to be heated to a high temperature, for example, in an operating range in which knocking is unlikely to occur, the efficiency of the engine 11 can be increased by increasing the target coolant temperature TW* as compared to other operating ranges. However, an increase in the target coolant temperature TW* lowers the cooling efficiency of the oil cooler-warmer 27, so that the transmission oil temperature TO is likely to increase. In this regard, the electronic control unit 30 lowers the target coolant temperature TW* in the temperature increase permitting range from the high target coolant temperature TH to the standard target coolant temperature TS when the transmission oil temperature TO is higher than or equal to the temperature increase suppressing temperature TO1. That is, when the transmission oil temperature TO is higher than or equal to the temperature increase suppressing temperature TO1 in the coolant temperature increasing control, the electronic control unit 30 executes a temperature increase suppressing process to change the target coolant temperature TW* in a case in which the engine 11 is operating in the temperature increase permitting range from the high target coolant temperature TH to the standard target coolant temperature TS. Thus, the coolant temperature increasing control for improving the efficiency of the engine 11 can be executed in a range in which an increase in the transmission oil temperature TO is suppressed to a proper extent.

(2) The temperature increase suppressing temperature TO1 is set to a temperature that is lower than the highest permission temperature TFL, which is the upper limit of the transmission oil temperature TO that permits the flex lock-up control to be executed. Therefore, the flex lock-up control is unlikely to be prohibited due to an increase in the transmission oil temperature TO.

Second Embodiment

An in-vehicle cooling system according to a second embodiment will now be described with reference to FIG. 7. In the second embodiment, like or the same reference numerals are given to those components that are like or the same as the corresponding components of the first embodiment, and the detailed description will be omitted.

Figure 7:
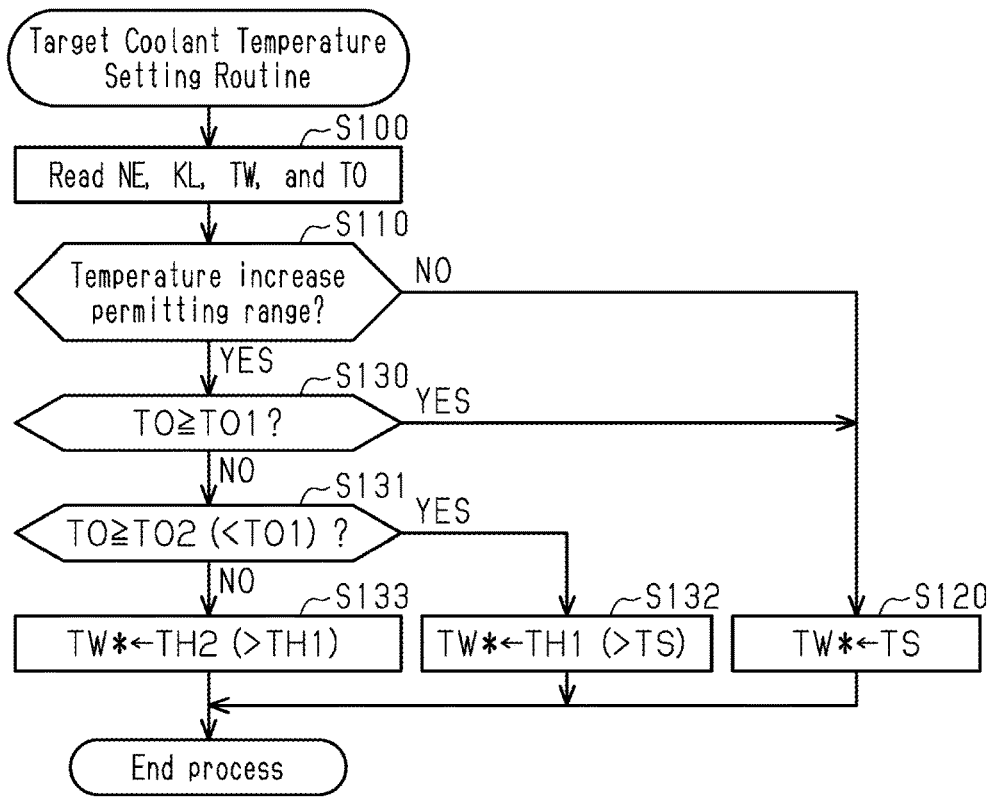
FIG. 7 is a flowchart of a target coolant temperature setting routine executed by an electronic control unit in an in-vehicle cooling system according to a second embodiment.

FIG. 7 shows a flowchart of a target coolant temperature setting routine in the in-vehicle cooling system of the present embodiment. The electronic control unit 30 repeatedly executes the routine at each specified control cycle during the operation of the engine 11.

When this routine is started, the electronic control unit 30 first acquires the engine rotation speed NE, the engine load KL, the outlet coolant temperature TW, and the transmission oil temperature TO in step S100. In the subsequent step S110, the electronic control unit 30 determines whether the engine 11 is currently operating in the temperature increase permitting range. If the engine 11 is operating in the temperature increase permitting range (S110: YES), the process proceeds to step S130. If the engine 11 is not operating in the temperature increase permitting range (S110: NO), the process proceeds to step S120. In step S120, the electronic control unit 30 sets the target coolant temperature TW* to the standard target coolant temperature TS, and thereafter ends the process of this routine in the current cycle. In step S130, the electronic control unit 30 determines whether the transmission oil temperature TO is higher than or equal to the above-described temperature increase suppressing temperature TO1 (referred to as a first temperature increase suppressing temperature TO1 in the present embodiment). When the transmission oil temperature TO is higher than or equal to the first temperature increase suppressing temperature TO1 (S130: YES), the electronic control unit 30 proceeds to step S120 and sets the target coolant temperature TW* to the standard target coolant temperature TS. The process thus far is the same as the first embodiment.

In the case of the present embodiment, when it is determined that the transmission oil temperature TO is lower than the first temperature increase suppressing temperature TO1 in step S130, the process proceeds to step S131. In step S131, the electronic control unit 30 determines whether the transmission oil temperature TO is higher than or equal to a second temperature increase suppressing temperature TO2, which is lower than the first temperature increase suppressing temperature TO1. When the transmission oil temperature TO is higher than or equal to the second temperature increase suppressing temperature TO2 (S131: YES), the electronic control unit 30 sets, in step S132, the target coolant temperature TW* to a first high target coolant temperature TH1, which is higher than the standard target coolant temperature TS, and thereafter ends the process of this routine in the current cycle. In contrast, when the transmission oil temperature TO is lower than the second temperature increase suppressing temperature TO2 (S131: NO), the electronic control unit 30 sets, in step S133, the target coolant temperature TW* to a second high target coolant temperature TH2, which is higher than the first high target coolant temperature TH1, and thereafter ends the process of this routine in the current cycle.

In the above-described present embodiment, the target coolant temperature TW* in the temperature increase permitting range is lowered from the second high target coolant temperature TH2 to the first high target coolant temperature TH1 when the transmission oil temperature TO is increased to the second temperature increase suppressing temperature TO2. Since the first high target coolant temperature TH1 is higher than the standard target coolant temperature TS, the coolant temperature increasing control is still able to improve the efficiency of the engine 11 to some extent when the target coolant temperature TW* is increased to the first high target coolant temperature TH1. Also, when the transmission oil temperature TO is further increased and reaches the first temperature increase suppressing temperature TO1, the target coolant temperature TW* in the temperature increase permitting range is lowered from the first high target coolant temperature TH1 to the standard target coolant temperature TS. As described above, in the present embodiment, the target coolant temperature TW* of the temperature increase permitting range is reduced in two steps in accordance with an increase in the transmission oil temperature TO. Thus, an increase in the transmission oil temperature TO is limited, while preventing the improvement of the efficiency of the engine 11 by the coolant temperature increasing control from being reduced.

Third Embodiment

An in-vehicle cooling system according to a third embodiment will now be described with reference to FIG. 8. In the third embodiment, like or the same reference numerals are given to those components that are like or the same as the corresponding components of the above-described embodiments, and the detailed description will be omitted.

Figure 8:
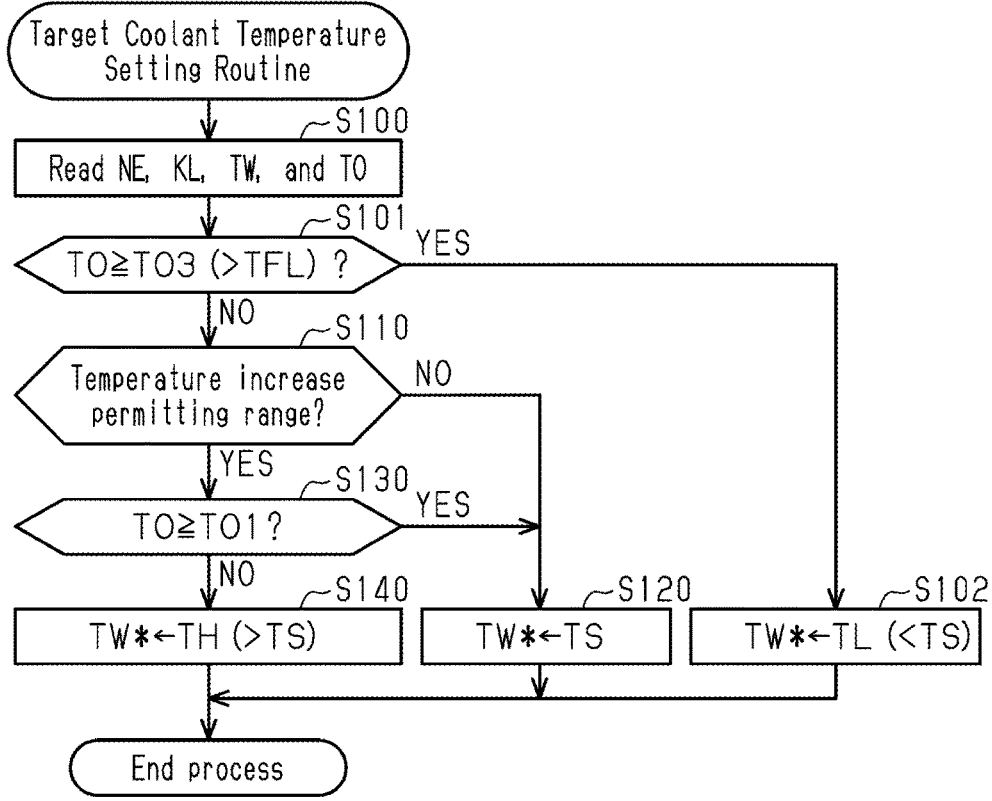
FIG. 8 is a flowchart of a target coolant temperature setting routine executed by an electronic control unit in an in-vehicle cooling system according to a third embodiment.

FIG. 8 shows a flowchart of a target coolant temperature setting routine in the in-vehicle cooling system of the present embodiment. The electronic control unit 30 repeatedly executes the routine at each specified control cycle during the operation of the engine 11.

When this routine is started, the electronic control unit 30 first acquires the engine rotation speed NE, the engine load. KL, the outlet coolant temperature TW, the outlet coolant temperature TW, and the transmission oil temperature TO in step S100. In the subsequent step S101, the electronic control unit 30 determines whether the transmission oil temperature TO is higher than or equal to a specified temperature reduction execution temperature TO3. The temperature reduction execution temperature TO3 is set to a temperature that is higher than the above-described highest permission temperature TFL. When the transmission oil temperature TO is lower than the temperature reduction execution temperature TO3 (S101: NO), the process proceeds to step S110, and the same process as step S110 of FIG. 4 is executed. When the transmission oil temperature TO is higher than or equal to the temperature reduction execution temperature TO3 (S101: YES), the process proceeds to step S102. In step S102, the electronic control unit 30 sets the target coolant temperature TW* to a low target coolant temperature TL, which is lower than the standard target coolant temperature TS, and thereafter ends the process of this routine in the current cycle.

In the present embodiment, when the transmission oil temperature TO is higher than or equal to the temperature reduction execution temperature TO3, the target coolant temperature TW* is set to the low target coolant temperature TL, which is lower than the standard target coolant temperature TS, regardless of whether or not the engine 11 is operating in the temperature increase permitting range. If the transmission oil temperature TO is further increased after exceeding the highest permission temperature TFL, switching of gears by the gearbox 15 may fail to be performed properly in addition to the flex lock-up control. This may hinder traveling of the vehicle 10. In this regard, the present embodiment executes a coolant temperature reduction control to lower the target coolant temperature TW* to a temperature lower than the standard target coolant temperature TS when the transmission oil temperature TO is further increased after exceeding the highest permission temperature TFL, so that a further increase in the transmission oil temperature TO is suppressed.

Fourth Embodiment

An in-vehicle cooling system according to a fourth embodiment will now be described with reference to FIGS. 9 and 10. In the fourth embodiment, like or the same reference numerals are given to those components that are like or the same as the corresponding components of the above-described embodiments, and the detailed description will be omitted.

Figure 9:
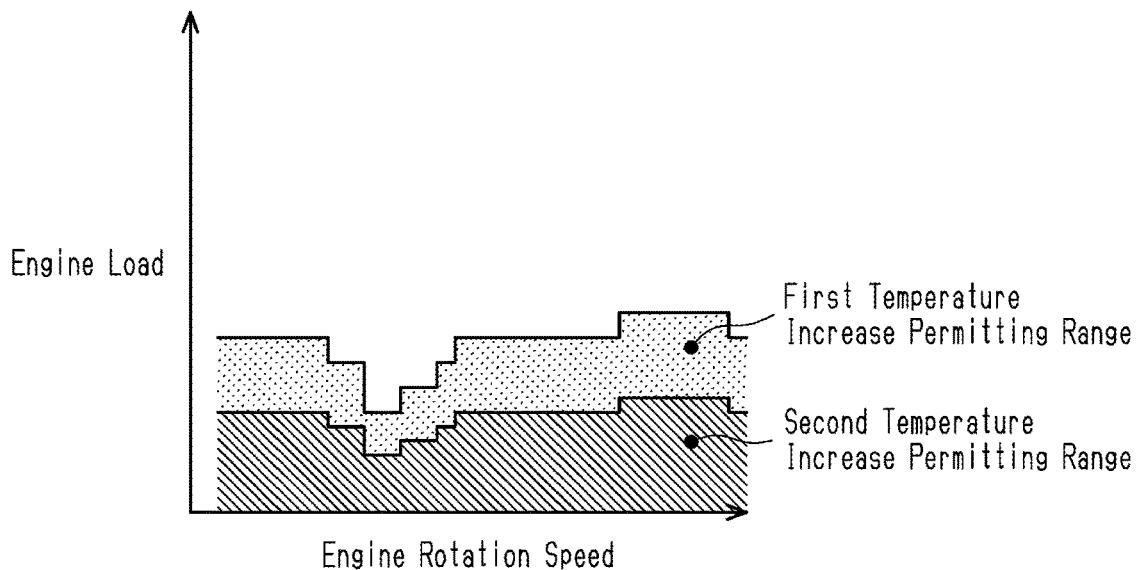
FIG. 9 is a diagram showing a manner in which a temperature increase permitting range is set in an in-vehicle cooling system according to a fourth embodiment.

As shown in FIG. 9, in the present embodiment, the temperature increase permitting range, in which knocking is unlikely to occur, is divided into two ranges: a first temperature increase permitting range on the higher load side and a second temperature increase permitting range on the lower load side. That is, knocking is further unlikely to occur in the second temperature increase permitting range than in the first temperature increase permitting range.

Figure 10:
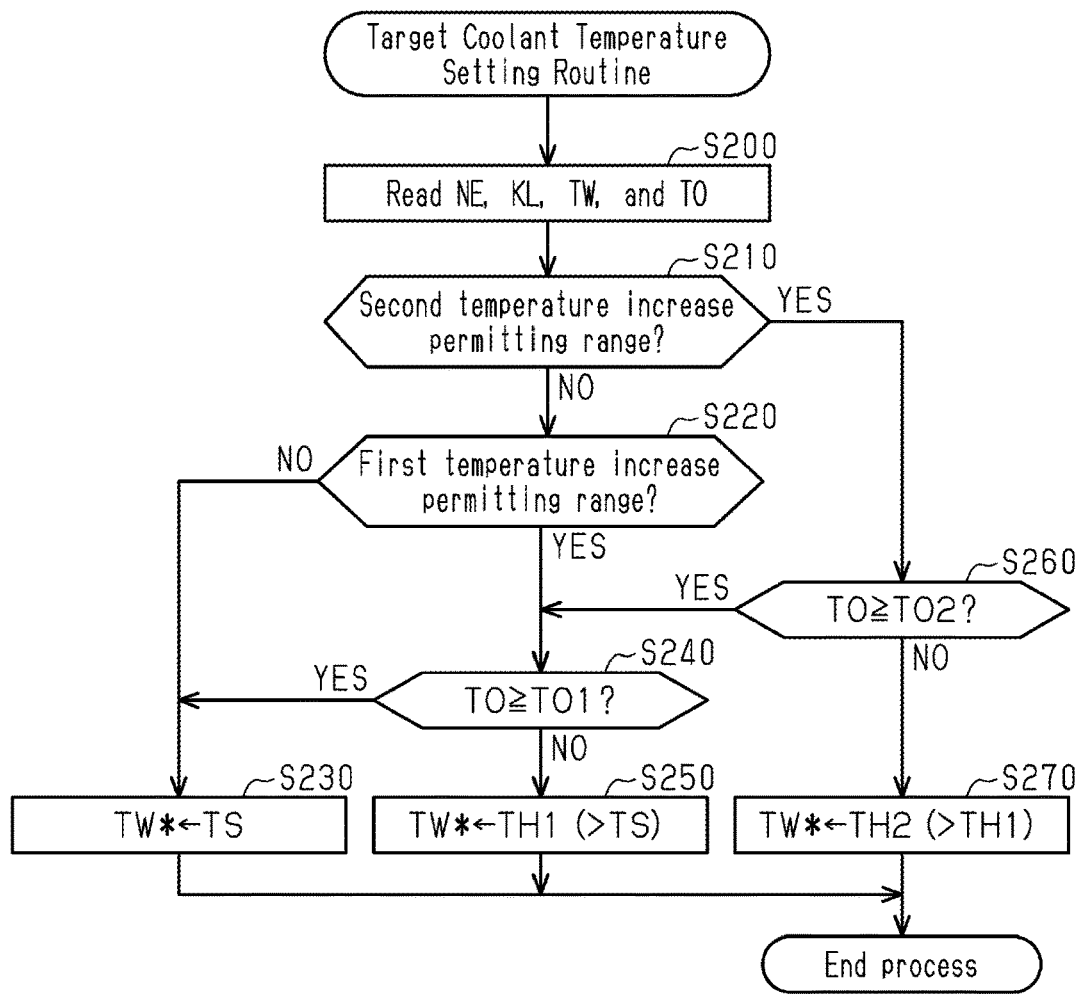
FIG. 10 is a flowchart of a target coolant temperature setting routine executed by an electronic control unit in the in-vehicle cooling system of FIG. 9.

FIG. 10 shows a flowchart of a target coolant temperature setting routine in the in-vehicle cooling system of the present embodiment. The electronic control unit 30 repeatedly executes the routine at each specified control cycle during the operation of the engine 11.

When this routine is started, the electronic control unit 30 first acquires the engine rotation speed NE, the engine load KL, the outlet coolant temperature TW, the outlet coolant temperature TW, and the transmission oil temperature TO in step S200. In the subsequent step S210, the electronic control unit 30 determines whether the engine 11 is operating in the second temperature increase permitting range. If the engine 11 is operating in the second temperature increase permitting range (S210: YES), the process proceeds to step S260. If not (S210: NO), the process proceeds to step S220.

In step S220, the electronic control unit 30 determines whether the engine 11 is operating in the first temperature increase permitting range. When the engine 11 is operating in neither the first temperature increase permitting range nor second temperature increase permitting range (S220: NO), the electronic control unit 30 sets the target coolant temperature TW* to the standard target coolant temperature TS in step S230, and thereafter ends the process of this routine in the current cycle.

On the other hand, when the engine 11 is operating in the first temperature increase permitting range (S220: YES), the electronic control unit 30 determines, in step S240, whether the transmission oil temperature TO is higher than or equal to the above-described temperature increase suppressing temperature TO1 (referred to as the first temperature increase suppressing temperature TO1 in the present embodiment). As described above, the first temperature increase suppressing temperature TO1 is set to a temperature that is lower than the highest permission temperature TFL. When the transmission oil temperature TO is lower than the first temperature increase suppressing temperature TO1 (S240: NO), the electronic control unit 30 sets, in step S250, the target coolant temperature TW* to the first high target coolant temperature TH1, and thereafter ends the process of this routine in the current cycle. When the transmission oil temperature TO is higher than or equal to the first temperature increase suppressing temperature TO1 (S240: YES), the process proceeds to step S230. That is, the target coolant temperature TW* is set to the standard target coolant temperature TS in this case.

When the engine 11 is operating in the temperature increase permitting range (S210: YES), the process proceeds to step S260. In this case, the electronic control unit 30 determines whether the transmission oil temperature TO is higher than or equal to the second temperature increase suppressing temperature TO2. As described above, the second temperature increase suppressing temperature TO2 is set to a temperature that is lower than the first temperature increase suppressing temperature TO1. That is, the first temperature increase suppressing temperature TO1 is a temperature that is higher than the second temperature increase suppressing temperature TO2 and lower than the highest permission temperature TFL.

When the transmission oil temperature TO is lower than the second temperature increase suppressing temperature TO2 (S260: NO), the process proceeds to step S270. In step S270, the electronic control unit 30 sets the target coolant temperature TW* to the second high target coolant temperature TH2, and thereafter ends the process of this routine in the current cycle. When the transmission oil temperature TO is higher than or equal to the second temperature increase suppressing temperature TO2 (S260: YES), the process proceeds to step S240. That is, in this case, the target coolant temperature TW* is set to the first high target coolant temperature TH1 when the transmission oil temperature TO is lower than the first temperature increase suppressing temperature TO1, and is set to the standard target coolant temperature TS when the transmission oil temperature TO is higher than or equal to the first temperature increase suppressing temperature TO1.

In the above-described present embodiment, the coolant temperature increasing control is executed while dividing the temperature increase permitting range into two operating ranges. Accordingly, the coolant temperature increasing control is executed in a fine manner in accordance with the likelihood of the occurrence of knocking in each operational zone.

Fifth Embodiment

An in-vehicle cooling system according to a fifth embodiment will now be described with reference to FIG. 11. In a vehicle 10 provided with the in-vehicle cooling system of the fifth embodiment, like or the same reference numerals are given to those components that are like or the same as the corresponding components of the above-described embodiments, and the detailed description will be omitted.

Figure 11:
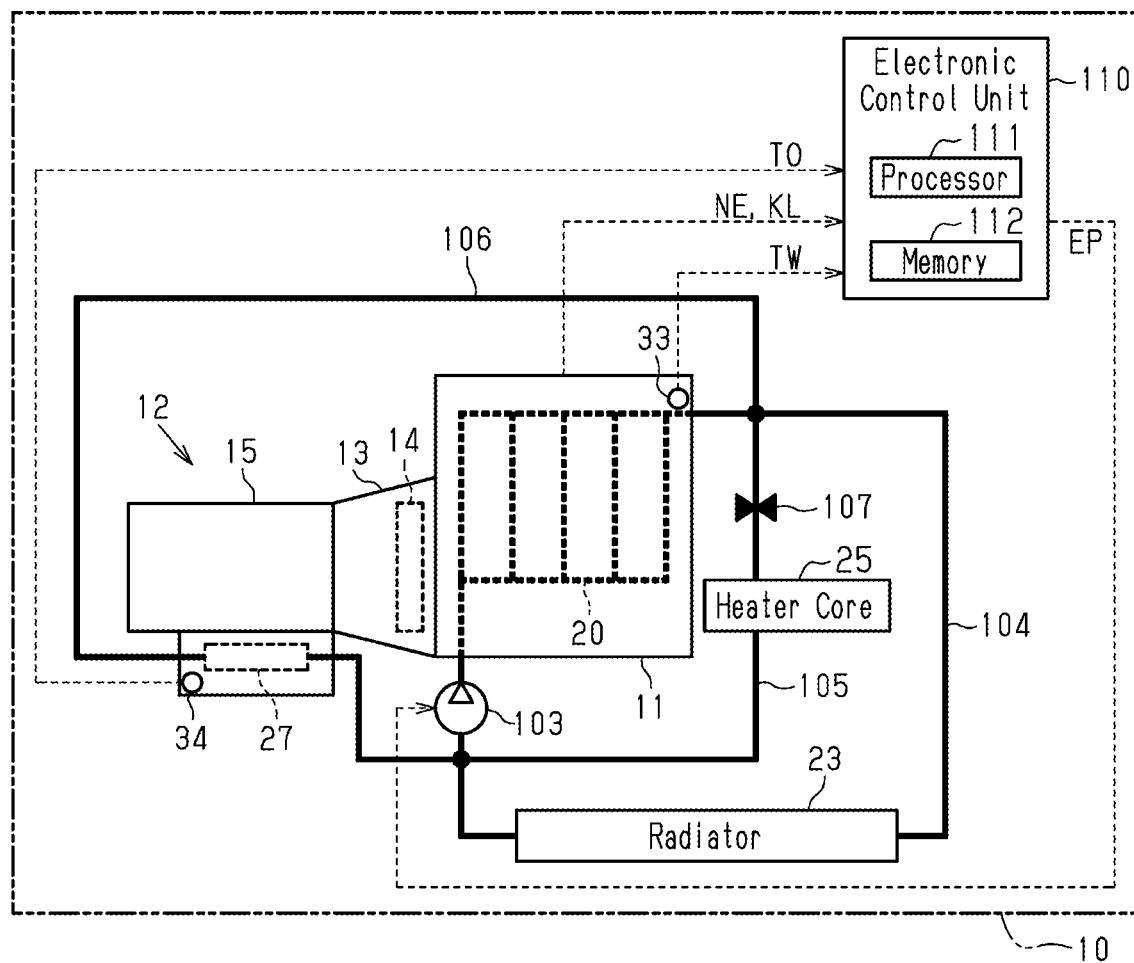
FIG. 11 is a schematic diagram of an in-vehicle cooling system according to a fifth embodiment.

As shown in FIG. 11, the vehicle 10 in which the in-vehicle cooling system of the present embodiment is employed includes an engine 11 and a transmission 12 coupled to the engine 11, as in the case of the first embodiment. The in-vehicle cooling system of the present embodiment further includes an electric water pump 103, which is driven by supply of electricity to deliver coolant under pressure to the water jacket 20 in the engine 11. The in-vehicle cooling system of the present embodiment also includes three coolant passages: a radiator passage 104, a heater passage 105, and a transmission passage 106, which are arranged to be parallel with each other and configured to return coolant that has passed through the water jacket 20 to the water pump 103. The radiator 23 is arranged in the radiator passage 104, the heater core 25 is arranged in the heater passage 105, and the oil cooler-warmer 27 is arranged in the transmission passage 106. Also, a shut-off valve 107 is arranged in series with the heater core 25 in the heater passage 105. The shut-off valve 107 cuts the flow of coolant in the heater passage 105 when heating of the passenger compartment is not being performed.

The in-vehicle cooling system of the present embodiment includes an electronic control unit 110, which is a coolant temperature controller. Like the electronic control unit 30 in the in-vehicle cooling system of the first embodiment, the electronic control unit 110 includes a processor 111 and a memory device 112. The electronic control unit 110 receives various types of information such as a detection result of the coolant temperature sensor 33, a detection result of the oil temperature sensor 34, the engine rotation speed NE, and the engine load KL.

In the present embodiment also, the electronic control unit 110 performs a coolant temperature control to regulate the outlet coolant temperature TW to the target coolant temperature TW*. The electronic control unit 110 of the present embodiment performs the coolant temperature control by controlling power supply EP to the water pump 103 in accordance with the difference between the target coolant temperature TW* and the outlet coolant temperature TW. Specifically, when the outlet coolant temperature TW is higher than the target coolant temperature TW*, the electronic control unit 110 increases the power supply EP to the water pump 103, thereby increasing the radiator flow rate. When the outlet coolant temperature TW is lower than the target coolant temperature TW*, the electronic control unit 110 reduces the power supply EP to the water pump 103, thereby reducing the radiator flow rate. Accordingly, the electronic control unit 110 regulates the radiator flow rate, so as to regulate the outlet coolant temperature TW to the target coolant temperature TW*.

In the present embodiment also, the electronic control unit 110 sets the target coolant temperature TW* through the target setting routine of FIG. 4. Therefore, the in-vehicle cooling system of the present embodiment has the above-described advantages (1) and (2) as in the case of the first embodiment.

The above-described embodiments may be modified as follows. The above-described embodiments and the following modifications can be combined as long as the combined modifications remain technically consistent with each other.

The setting of the target coolant temperature in the in-vehicle cooling system according to the fifth embodiment may be executed through the process of the target coolant temperature setting routine in the second to fourth embodiments.

In the coolant temperature control in the fourth embodiment, the coolant temperature reduction control may be additionally executed as in the case of the third embodiment.

In the third embodiment, the temperature reduction execution temperature TO3 is set to a temperature higher than the highest permission temperature TFL. However, the temperature reduction execution temperature TO3 may be set to a temperature that is higher than the temperature increase suppressing temperature TO1 and lower than the highest permission temperature TFL. In such a case, the flex lock-up control is further unlikely to be prohibited due to an increase in the transmission oil temperature TO.

In the target coolant temperature setting routine in the first and third embodiments, the target coolant temperature TW* in the temperature increase permitting range is increased to the standard target coolant temperature TS when the transmission oil temperature TO has increased to the temperature increase suppressing temperature TO1. However, the target coolant temperature TW* in the temperature increase permitting range, which is set when the transmission oil temperature TO is higher than or equal to the temperature increase suppressing temperature TO1, may be a temperature that is lower than the high target coolant temperature TH and higher than the standard target coolant temperature TS. Likewise, in the target coolant temperature setting routine in the second and fourth embodiments, the target coolant temperature TW* in the temperature increase permitting range that is set when the transmission oil temperature TO is higher than or equal to the first temperature increase suppressing temperature TO1 may be a temperature that is lower than the first high first high target coolant temperature TH1 and higher than the standard target coolant temperature TS.

In the coolant temperature control in each of the above-described embodiments, the target coolant temperature TW* is changed in accordance with the transmission oil temperature TO. This causes hunting in the coolant temperature control in some cases. To suppress the occurrence of such hunting, the target coolant temperature TW* may be prevented from being changed for a certain amount of time after being changed.

In the second embodiment, the target coolant temperature TW* of the temperature increase permitting range is reduced in two steps in accordance with an increase in the transmission oil temperature TO. However, the target coolant temperature TW* may be reduced in three or more steps. Also, in the fourth embodiment, the target coolant temperature TW* of the second temperature increase permitting range is reduced in two steps in accordance with an increase in the transmission oil temperature TO. However, the target coolant temperature TW* may be reduced in three or more steps.

In the in-vehicle cooling system of each of the above-described embodiments, the oil cooler-warmer 27, which both cools and heats hydraulic oil, is provided in the transmission passage 28, 106, which is a bypass passage that bypasses the radiator 23. The oil cooler-warmer 27 may be replaced by an oil cooler, which only cools hydraulic oil. In this case, the oil cooler can be arranged in a section of the coolant circuit into which coolant that has passed through the radiator passages 24, 104 flows. In this manner, it suffices if an oil cooler is provided that performs at least cooling of hydraulic oil, which is one of cooling of hydraulic oil and heating of hydraulic oil.

In each of the above-described embodiments, the temperature increase suppressing temperatures TO1, TO2 are set to a temperature that is lower than the highest permission temperature TFL, which is the upper limit of the transmission oil temperature TO that permits the flex lock-up control to be executed. An excessive increase in the transmission oil temperature TO limits operation of the transmission 12 other than the flex lock-up control. The prohibition of a change of the target coolant temperature TW* to the higher temperature side in the coolant temperature increasing process prevent such limitation on operations of the transmission 12 other than the flex lock-up control. In such a case, the temperature increase suppressing temperature is preferably set to a temperature that is slightly lower than the transmission oil temperature TO at which the subject operation of the transmission 12 is limited.

The electronic control units 30, 110 may be circuitry. The circuitry may include: 1) one or more processors that operate according to a computer program (software); 2) one or more dedicated hardware circuits (application specific integrated circuits: ASIC) that execute at least part of various processes, or 3) a combination thereof. The processor may include a CPU and memories such as a RAM and a ROM. The memories may store program codes or commands configured to cause the CPU to execute processes. The memory, which is computer readable medium, may include any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:
1. An in-vehicle cooling system, comprising:
a coolant circuit having a portion that passes through an inside of an engine;
a radiator provided in the coolant circuit, the radiator being configured to cool coolant through heat exchange between the coolant and an outside air;
an oil cooler provided in the coolant circuit, the oil cooler being configured to cool hydraulic oil of a transmission through heat exchange between the hydraulic oil and the coolant; and
processing circuitry configured to regulate a radiator flow rate, which is a flow rate of the coolant passing through the radiator, thereby regulating a temperature of the coolant to a target coolant temperature, wherein
the processing circuitry is configured to execute
a coolant temperature increasing control, which sets the target coolant temperature to a specified standard target coolant temperature when the engine is not operating in a specified temperature increase permitting range, and sets the target coolant temperature to a high target coolant temperature, which is higher than the standard target coolant temperature, when the engine is operating in the temperature increase permitting range, and a temperature increase suppressing process, which changes, in the coolant temperature increasing control, the target coolant temperature that is set when the engine is operating in the temperature increase permitting range to a temperature lower than the high target coolant temperature and higher than or equal to the standard target coolant temperature, when a temperature of the hydraulic oil is higher than or equal to a specified temperature increase suppressing temperature.

2. The in-vehicle cooling system according to claim 1, wherein the processing circuitry is configured to execute a coolant temperature reduction control that changes the target coolant temperature to a temperature lower than the standard target coolant temperature when the temperature of the hydraulic oil is higher than or equal to a temperature reduction execution temperature, which is higher than the temperature increase suppressing temperature.

3. The in-vehicle cooling system according to claim 1 wherein the in-vehicle cooling system is mounted in a vehicle in which the transmission is provided with a lock-up clutch configured to execute a flex lock-up control, and the temperature increase suppressing temperature is set to a temperature lower than a highest permission temperature, the highest permission temperature being an upper limit of the temperature of the hydraulic oil that permits the flex lock-up control to be executed.

4. The in-vehicle cooling system according to claim 3, wherein the processing circuitry is configured to execute a coolant temperature reduction control that changes the target coolant temperature to a temperature lower than the standard target coolant temperature when the temperature of the hydraulic oil is higher than or equal to a temperature reduction execution temperature, which is higher than the highest permission temperature.

5. The in-vehicle cooling system according to claim 1, wherein the temperature increase suppressing temperature is a first temperature increase suppressing temperature, and the temperature increase suppressing process includes:

a process that changes the target coolant temperature in the temperature increase permitting range to the standard target coolant temperature when the temperature of the hydraulic oil is higher than or equal to the first temperature increase suppressing temperature, a process that changes the target coolant temperature in the temperature increase permitting range to a first high target coolant temperature higher than the standard target coolant temperature when the temperature of the hydraulic oil is lower than the first temperature increase suppressing temperature and higher than or equal to a second temperature increase suppressing temperature, the second temperature increase suppressing temperature being lower than the first temperature increase suppressing temperature, and a process that changes the target coolant temperature in the temperature increase permitting range to a second high target coolant temperature higher than the first high target coolant temperature when the temperature of the hydraulic oil is lower than the second temperature increase suppressing temperature.

6. The in-vehicle cooling system according to claim 1, further comprising a flow rate control valve or a water pump that is arranged in the coolant circuit, wherein the processing circuitry is configured to regulate the radiator flow rate by operating the flow rate control valve or the water pump.

7. The in-vehicle cooling system according to claim 1, wherein the coolant circuit includes a passage that returns the coolant that has passed through the inside of the engine back to the inside of the engine, the passage includes a radiator passage that runs through the radiator and a bypass passage that bypasses the radiator, the in-vehicle cooling system further comprises a flow rate control valve that is arranged in the coolant circuit, the flow rate control valve includes a valve member, the flow rate control valve is configured to change an operating position of the valve member, thereby changing a ratio of a flow rate of the coolant through the radiator passage and a flow rate of the coolant through the bypass passage, and the processing circuitry is configured to regulate the radiator flow rate by operating the flow rate control valve.

8. The in-vehicle cooling system according to claim 7, wherein the oil cooler is arranged in the bypass passage.

9. The in-vehicle cooling system according to claim 1, further comprising an electric water pump, which is configured to be driven by supply of electricity to circulate the coolant in the coolant circuit, the processing circuitry is configured to regulate the radiator flow rate by controlling the supply of electricity to the water pump.

10. A method of controlling an in-vehicle cooling system, wherein the in-vehicle cooling system includes:

a coolant circuit having a portion that passes through an inside of an engine;

a radiator provided in the coolant circuit, the radiator being configured to cool coolant through heat exchange between the coolant and an outside air; and an oil cooler provided in the coolant circuit, the oil cooler being configured to cool hydraulic oil of a transmission through heat exchange between the hydraulic oil and the coolant, the method comprises:

regulating a radiator flow rate, which is a flow rate of the coolant passing through the radiator, thereby regulating a temperature of the coolant to a target coolant temperature;

setting the target coolant temperature to a specified standard target coolant temperature when the engine is not operating in a specified temperature increase permitting range;

setting the target coolant temperature to a high target coolant temperature, which is higher than the standard target coolant temperature, when the engine is operating in the temperature increase permitting range; and changing the target coolant temperature that is set when the engine is operating in the temperature increase permitting range to a temperature lower than the high target coolant temperature and higher than or equal to the standard target coolant temperature, when a temperature of the hydraulic oil is higher than or equal to a specified temperature increase suppressing temperature.

11. The method according to claim 10, further comprising changing the target coolant temperature to a temperature lower than the standard target coolant temperature, when the temperature of the hydraulic oil is higher than or equal to a temperature reduction execution temperature, which is higher than the temperature increase suppressing temperature.

* * * * *